United States Patent [19]

Deamer

[11] 4,348,149

[45] Sep. 7, 1982

[54] MOBILE TRANSPORTER FOR MINES

[75] Inventor: Charles R. Deamer, Church Point, Australia

[73] Assignee: Noyes Bros. Pty. Limited, St. Leonards, Australia

[21] Appl. No.: 137,115

[22] Filed: Apr. 2, 1980

[30] Foreign Application Priority Data

Apr. 17, 1979 [AU] Australia .............................. PD8383

[51] Int. Cl.³ .............................................. B60P 3/00
[52] U.S. Cl. ................................... 414/458; 280/43.23
[58] Field of Search ....................... 414/458, 495, 498; 280/43.23

[56] References Cited

U.S. PATENT DOCUMENTS

| 2,290,652 | 7/1942 | Russell | 414/458 |
|---|---|---|---|
| 2,775,357 | 12/1956 | Arment | 414/458 |
| 3,009,711 | 11/1961 | White | 280/43.23 |
| 3,271,042 | 9/1966 | Flodin | 280/43.23 |
| 3,346,131 | 10/1967 | Lundell | 414/495 X |
| 4,015,735 | 4/1977 | Berglund et al. | 414/458 X |
| 4,020,960 | 5/1977 | Louis et al. | 414/458 |

FOREIGN PATENT DOCUMENTS 1022609 3/1953 France .
1278053 10/1961 France .

Primary Examiner—James L. Rowland
Attorney, Agent, or Firm—Wegner, McCord, Wood & Dalton

[57] ABSTRACT

A multi-purpose articulated transport unit adapted to transport any one of a number of attachments, the unit including a prime-mover and a trailer, with the trailer consisting of two sub-frames which are pivotably attached to allow pivoting about a horizontal axis, and a support on one of the sub-frames adapted to engage and retain the attachment on the trailer.

2 Claims, 11 Drawing Figures

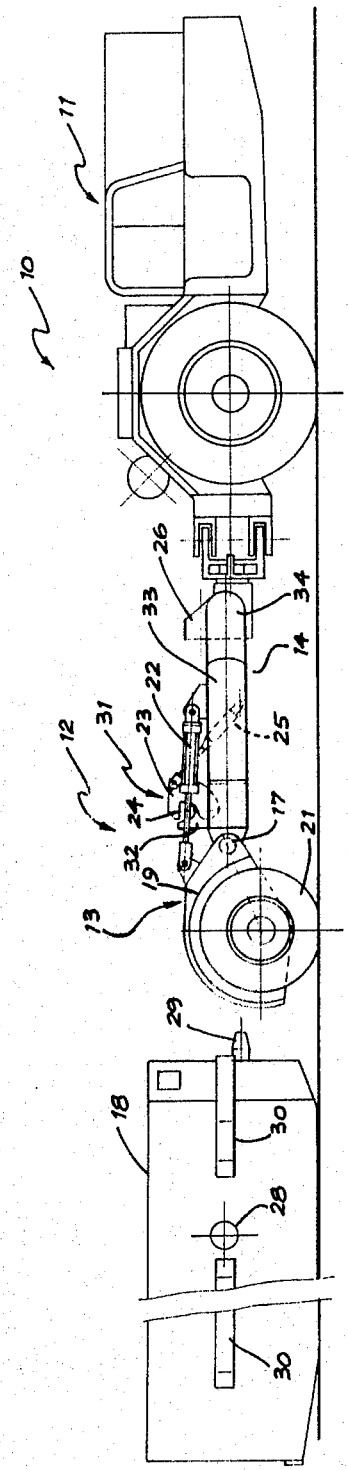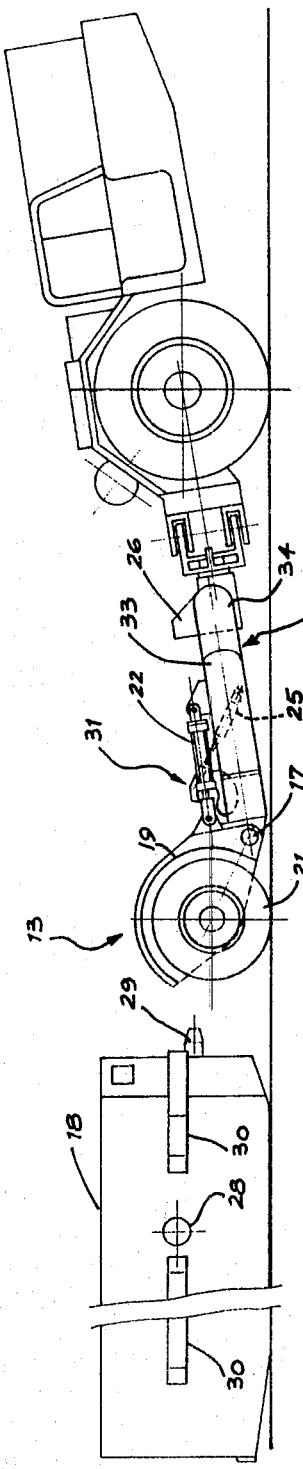

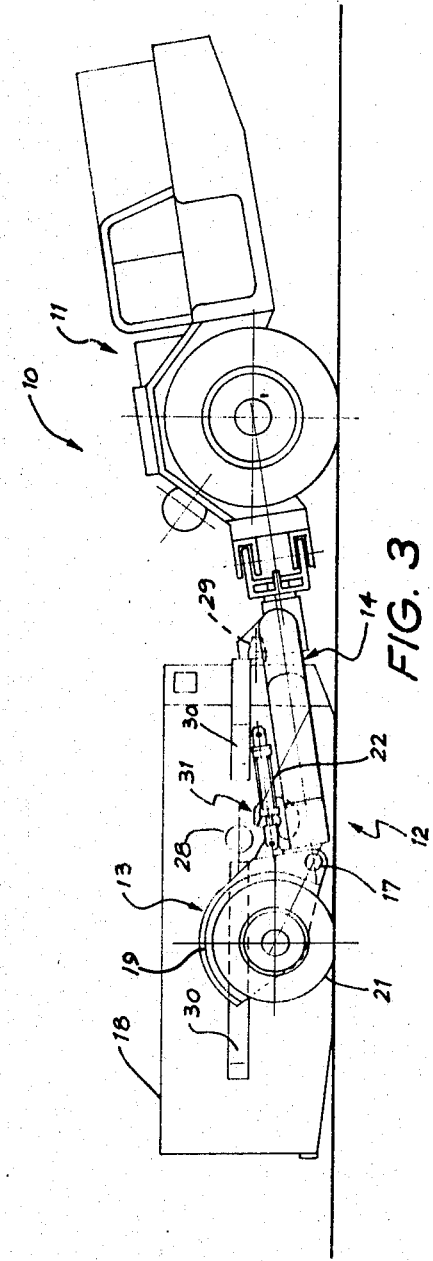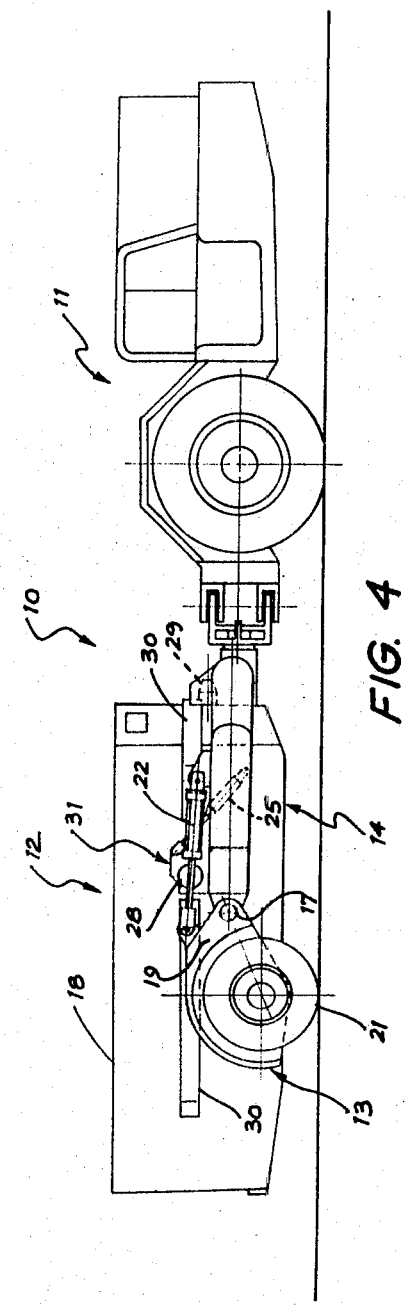

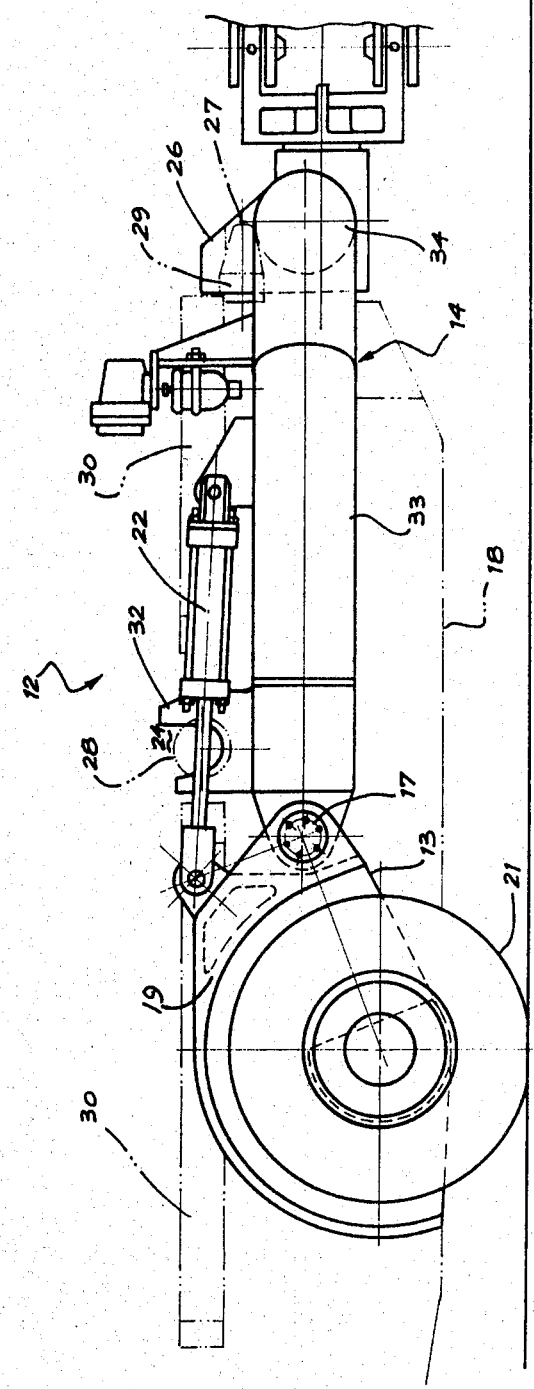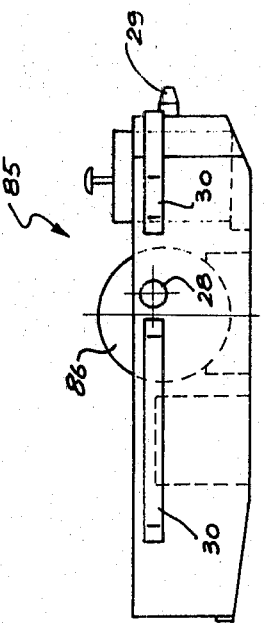

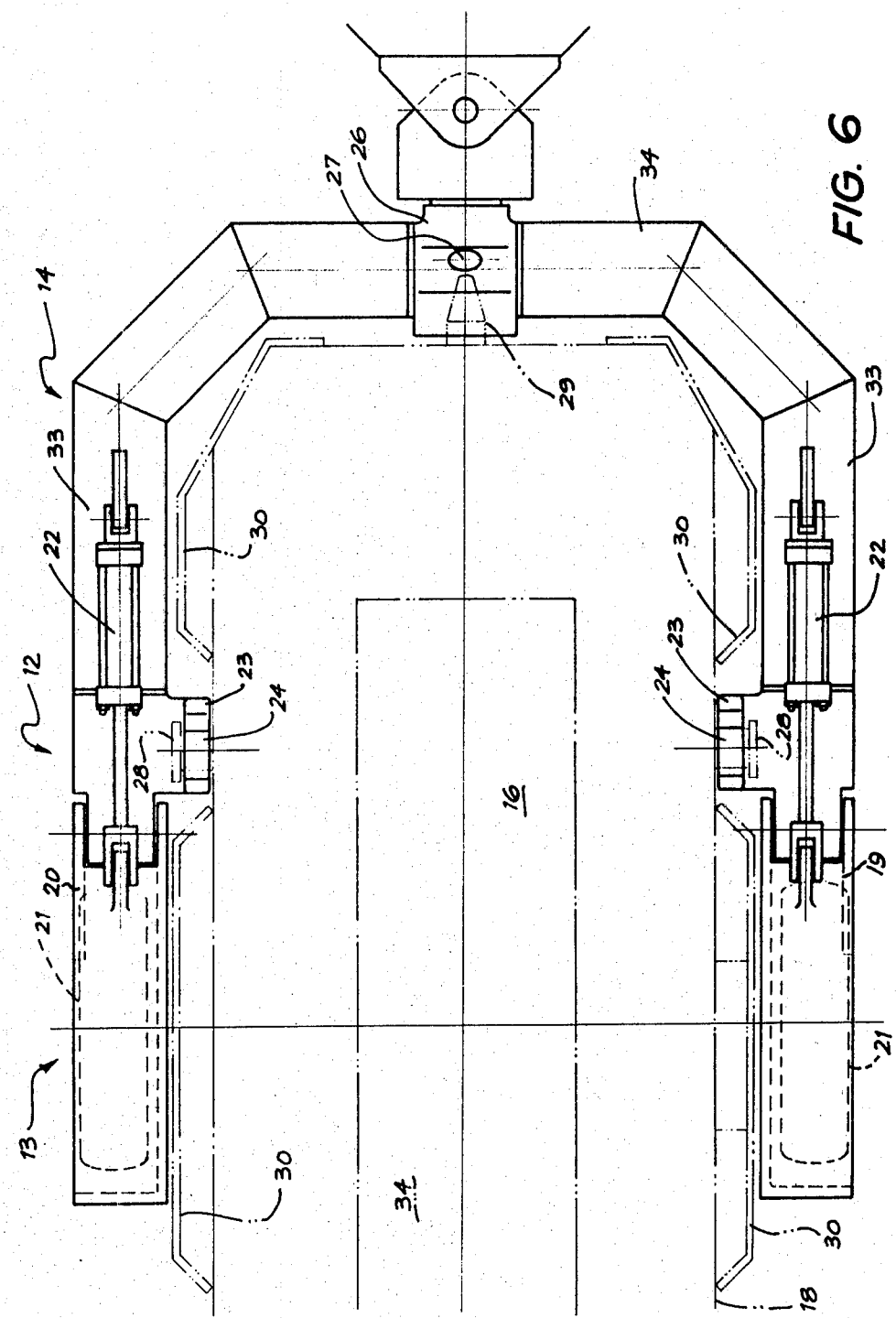

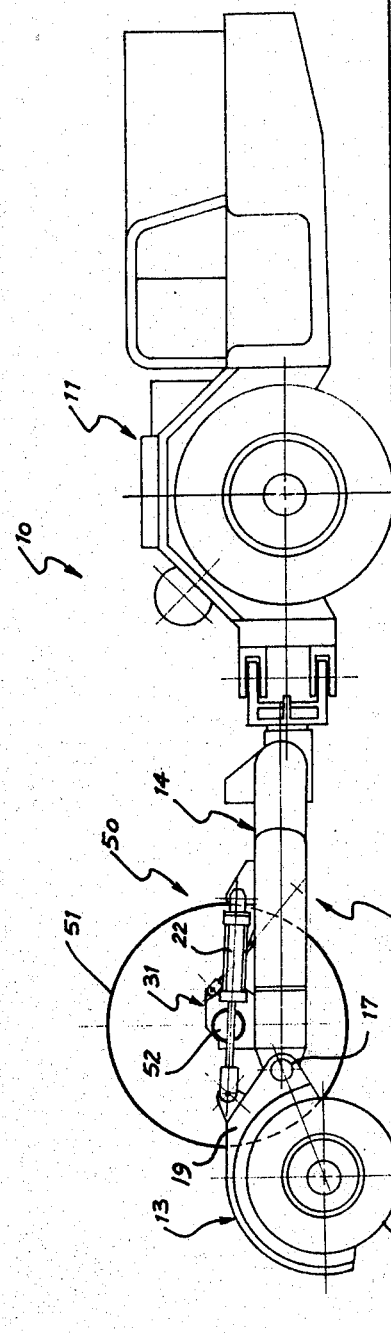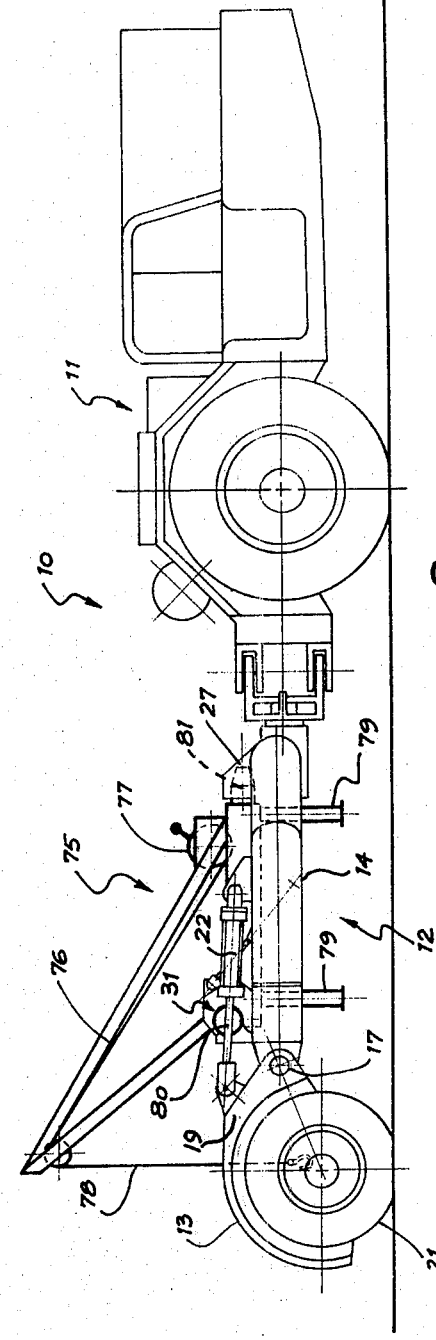

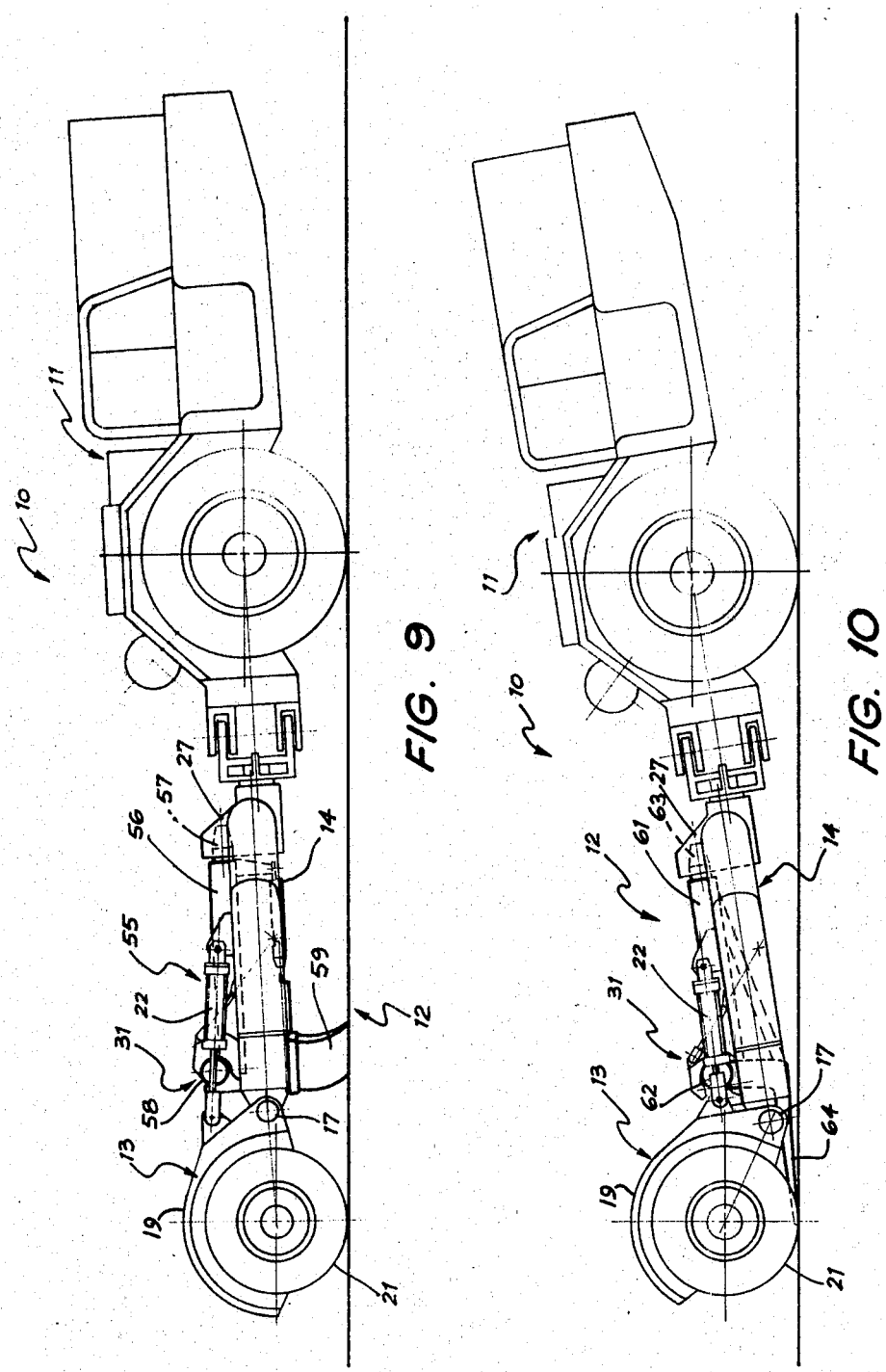

MOBILE TRANSPORTER FOR MINES

The present invention relates to motor vehicles and more particularly but not exclusively to multi-purpose transport vehicles for use in mines.

In the mining industry, vehicles presently employed are not versatile in their use, and accordingly, there is required large capital investment to provide a range of vehicles necessary for efficient mining operations.

It is the object of the present invention to overcome or substantially ameliorate the above disadvantages.

There is disclosed herein a transport assembly comprising a wheeled first frame means having two transversly spaced sub-frames each with at least one wheel, a second frame means, pivot means coupling the sub-frames to the second frame enabling pivoting therebetween about a generally horizontal axis, motor means extending between the first and second frame means to selectively cause the pivoting about said axis, said first and second frame means defining a docking space to receive a unit to be transported by the assembly with one sub-frame on each side of said space, unit support means on one of the frame means adapted to engage and support said unit, said support means being positioned so as to be vertically movable between a first upper position supporting said unit and a second lower position releasing said unit in response to the said pivoting of the two frame means.

A preferred form of the present invention will now be described by way of example with reference to the accompanying drawings wherein:

FIG. 1 depicts a multi-purpose transport vehicle having a trailer and prime-mover and attachment to be mounted on the trailer thereof.

FIG. 2 depicts the vehicle and attachment of FIG. 1 with the vehicle configured to engage the attachment;

FIG. 3 depicts the vehicle of FIG. 1 with the attachment docked in the trailer of the vehicle;

FIG. 4 depicts the vehicle of FIG. 1 with the attachment mounted thereon;

FIG. 5 is a side elevation of the trailer of FIG. 1;

FIG. 6 is a plan view of the trailer of FIG. 5;

FIGS. 7 to 11 depict alternative attachments to be mounted on the trailer of FIG. 1.

The multi-purpose articulated vehicle 10 is adapted for mine use and capable of transporting any one of a number of attachments. In FIG. 1 the attachment 18 which is a personal transport unit. The vehicle 10 includes a prime-mover 11 and a trailer 12 which consists of two frame portions 13 and 14. The frame portions 13 and 14 define a docking area 16 (see FIG. 6) within which is located the attachment 18 when the attachment 18 is either supported by the trailer 12 or is either in the process of being engaged by or released by trailer 12. The frame portion 14 is of generally "U" shaped configuration, in plan view, with two side arms 33 and a base 34. The frame portion 13 consists of two sub-frames 19 and 20, each of which has a wheel 21 supporting it. Each of the sub-frames 19 and 20 is pivotally attached to the frame portion 14 by means of a pin 17. Extending between the sub-frames 19 and 20 and frame portion 14 are hydraulic means 22 which determine the angular relation between the sub-frames 19 and 20 and frame portion 14. The frame portions 13 and 14 are configured so as to be angularly movable between a first position (FIG. 1) wherein the frame portions 13 and 14 extend generally horizontal, and a second position (FIG. 2) wherein they are rotated toward each other through an acute angle.

Mounted on the trailer portion 14 are two latches 31 each of which includes a recessed member 23 and a retainer 32. The retainers 32 are pivotably movable between a first position exposing the recesses 24 of members 23 and a second position closing the recesses 24 by means of hydraulic rams 25. Also mounted on the trailer portion 14 is a further retaining means 26 with a passage 27.

The attachment 18 is provided with "T-shaped" spigots 28 and a pin 29 which are engaged by the latches 31 and retaining means 26 respectively. The latches 31 are so positioned on the frame portion 14 so as to be moved vertically by the pivoting of the two frame portions 13 and 14 between a lower first position below the spigots 28 and an upper second position above the spigots 28. The attachment 18 is also provided with guides 30 to aid in docking.

In operation the attachment 18 is located within the docking area 16 via entrance opening 34 with the pin 29 extending into passage 27 and the trailer 12 in the configuration as shown in FIGS. 2 and 3. The latches 31 are located in the lower first position and are in their open configuration. As the rams 22 are activated to pivot the two frame portions 13 and 14 to the configuration depicted in FIGS. 1 and 4, the latches 31 are moved to their upper second position thereby taking with them the spigots 28 which are located within the recesses 24. Upon the spigots 28 being securely located within recess 24 the rams 25 are actuated to close the recesses 24 by movement of retainers 23.

The attachment 18 is generally self-aligning within the docking area 16 by means of the guides 30 and the leading portion of pin 29 being tapered to facilitate entry of the pin 29 into passage 27.

In FIG. 7 there is depicted an attachment 50 which is adapted to lay cable from a drum 51 which is supported by the trailer 12 by means of a shaft 52.

In FIG. 9 there is depicted an earth moving attachment 55 which includes a main frame 56 with a pin 57 and spigots 58 which are engaged within passage 27 and latches 31 respectively. Fixed to the main frame 56 and extending downwardly therefrom is an earth engaging blade 59.

In FIG. 10 there is depicted a fork-lift attachment 60 having a main frame 61 with a pin 63 and spigots 62 engaged within the passage 27 and latches 31 respectively. Also attached to the main frame 61 are tines 64 which are vertically movable by operation of ram 22.

In FIG. 8 there is depicted a crane attachment 75 which has a main vertically extending frame 76 and winch 77 to operate line 78. Extending downward from the frame 76 are legs 79. Attached to the frame 76 are spigots 80 and a pin 81 which are engaged within the latches 31 and passage 27 respectively.

Finally, there is depicted in FIG. 11 a service unit 85 which may have a fuel drum 86 or other bulk storage devices together with other servicing tools and requirements.

It should be appreciated that although the latches 31 are described and depicted as being located on the frame portion 14, they could equally be located on the frame portion 13, and on the inner or outer part of the frame portion 13 with respect to the wheels 21.

What I claim is:

1. A transport assembly adapted to transport a variety of attachments with the attachments having three mounting points, two of which comprise transversely spaced horizontally projecting spigots and the third mounting point being a forwardly horizontally projecting pin, said assembly comprising:

(a) a horizontal "U"-shaped main frame having two generally parallel co-extensive transversely spaced side arms joined by a transverse base so that a load receiving area is defined between the two side arms, (b) a subframe pivotally attached to each arm so that both subframes pivot about a common horizontal axis extending generally transverse of the normal direction of travel of the transport assembly, (c) a wheel rotatably fixed to each subframe so that the wheels are rotatable about a common horizontal axis parallel to the pivot axis of said arms, (d) coupling means adapted to secure an attachment to the transport assembly, said coupling assembly comprising three spaced reaction points of which two are transversely spaced and the third is longitudinally spaced relative to the others, each of said subframes having one of said two reaction points with the third reaction point being located on said transverse base, said two reaction points each comprising a latch which consists of a recessed member adapted to receive one of said spigots and a retainer adapted to selectively secure the spigot within the recessed member, said third reaction point including a hollow member having a generally horizontal rearwardly open passage adapted to receive said pin, and (e) motor means extending between said subframes and main frame so as to pivotally move said subframes between an upper and a lower position so that said attachment is locatable within said space when said subframes are in said lower position, and is supported by said three reaction points when said subframes are in said upper position.

2. The assembly of claim 1 further including a forward coupling adapted to engage a prime-mover, said forward coupling enabling relative pivoting between the prime-mover and assembly about a generally horizontal and vertical axis.

* * * * *

UNITED STATES PATENT AND TRADEMARK OFFICE
CERTIFICATE OF CORRECTION

PATENT NO. : 4,348,149
DATED : September 7, 1982
INVENTOR(S) : Charles R. Deamer It is certified that error appears in the above–identified patent and that said Letters Patent are hereby corrected as shown below:

Claim 1, column 3, line 22 - Delete "subframes" and substitute therefor --arms--

Signed and Sealed this

Tenth Day of May 1983

[SEAL]

Attest:

GERALD J. MOSSINGHOFF

Attesting Officer

Commissioner of Patents and Trademarks